United States Patent
Zhou et al.

(10) Patent No.: US 12,176,583 B2
(45) Date of Patent: Dec. 24, 2024

(54) PROTECTIVE FILM ASSEMBLY AND ENERGY STORAGE DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Fujian (CN); Yongfeng Xiong, Fujian (CN); Ming Yang, Fujian (CN)

(73) Assignees: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/119,404

(22) Filed: Mar. 9, 2023

(65) Prior Publication Data
US 2024/0162588 A1 May 16, 2024

(30) Foreign Application Priority Data

Nov. 11, 2022 (CN) .......................... 202211416058.5

(51) Int. Cl.
*H01M 50/593* (2021.01)
*H01M 50/586* (2021.01)

(52) U.S. Cl.
CPC ....... *H01M 50/593* (2021.01); *H01M 50/586* (2021.01)

(58) Field of Classification Search
CPC .......................... H01M 50/593; H01M 50/586
See application file for complete search history.

(56) References Cited

U.S. PATENT DOCUMENTS

2008/0292956 A1   11/2008   Hong et al.
2015/0340663 A1*  11/2015   Minagata ............. H01M 50/119
                                                                429/163

FOREIGN PATENT DOCUMENTS

CN        204927359 U    12/2015
CN        208655734 U     3/2019
(Continued)

OTHER PUBLICATIONS

Notice of Granting Invention Patent Right dated Jan. 16, 2023 received in Chinese Patent Application No. CN 202211416058.5.
(Continued)

*Primary Examiner* — Daniel S Gatewood
(74) *Attorney, Agent, or Firm* — Scully, Scott, Murphy & Presser, P.C.

(57) ABSTRACT

The present disclosure discloses a protective film assembly, applied to an electrode assembly of an energy storage device, and including an insulation sheet for wrapping the electrode assembly and arranged between a housing of the energy storage device and the electrode assembly. The first side surface covering region includes a first covering sub-region and a second covering sub-region which can overlap each other; the second side surface covering region includes a third covering sub-region and a fourth covering sub-region which can overlap each other; the maximum sizes of the first covering sub-region and the second covering sub-region in a thickness direction and height direction of the electrode assembly are equal, so that the first covering sub-region and the second covering sub-region have a high matching degree and a large bonding area. The present disclosure further discloses an energy storage device.

20 Claims, 5 Drawing Sheets

(56) References Cited

FOREIGN PATENT DOCUMENTS

| CN | 109962201 A | 7/2019 | | |
|---|---|---|---|---|
| CN | 210349998 U | 4/2020 | | |
| CN | 112421093 A | 2/2021 | | |
| CN | 213150885 U | 5/2021 | | |
| CN | 214280077 U | 9/2021 | | |
| CN | 216698572 U | 6/2022 | | |
| CN | 115458844 A | 12/2022 | | |
| CN | 116073036 A | 5/2023 | | |
| JP | 2022128818 A | * | 9/2022 | ........ H01M 10/0587 |
| WO | 2019153459 A1 | 8/2019 | | |

OTHER PUBLICATIONS

Notice of First Review Opinion dated Dec. 19, 2022 received in Chinese Patent Application No. CN 202211416058.5.
International Search Report dated Aug. 11, 2023 received in International Application No. PCT/CN2022/131501.

\* cited by examiner

Sectional diagram along A-A

Sectional diagram along B-B

Sectional diagram along C-C

PROTECTIVE FILM ASSEMBLY AND ENERGY STORAGE DEVICE

CROSS-REFERENCE TO RELATED APPLICATION

The application claims priority to Chinese patent application CN202211416058.5, filed on 11, 11, 2022, the entire contents of which are incorporated herein by reference for all purposes.

FIELD

The present disclosure relates to the field of energy storage, and in particular, to a protective film assembly and an energy storage device.

BACKGROUND

A power energy storage device is an energy storage device commonly used in the technical field of new energy at present. It is widely used in equipment such as an electric vehicle, has the advantages of energy conservation and environmental protection, and is also a development trend of future new energy.

For the power energy storage device, in order to achieve insulation, collision prevention and other protections for an electrode assembly, an outer surface of the electrode assembly will be wrapped with a protective film. As described in Chinese patent CN 208655734 U, an insulation sheet is divided into a bottom insulation sheet corresponding to a bottom surface of the electrode assembly, and a main wrapping region and auxiliary wrapping regions corresponding to side surfaces of the electrode assembly. The main wrapping region can be bent relative to the bottom insulation sheet, and the auxiliary wrapping region is connected to the main wrapping region and can be bent relative to the main wrapping region, so that the insulation sheet can be bent to form an insulation protective cover wrapping the electrode assembly.

However, in the structure of CN 208655734 U, the auxiliary wrapping regions need to cling to each other to ensure the structural stability of the formed insulation protective cover. In order to achieve a fool-proofing effect, areas of the auxiliary wrapping regions are greatly different.

It can be seen that a bonding area is limited when two auxiliary wrapping regions with different areas cling. As a result, the structural stability of the insulation protective cover is poor, which leads to a failure of covering of the electrode assembly and reduces the safety performance of the energy storage device.

SUMMARY

The embodiments of the present disclosure disclose a protective film assembly and an energy storage device, which can solve the problem of short circuit easily caused by a failure of bonding due to a small bonding area after an insulation sheet is bent in the related technology.

In order to achieve the above object, in a first aspect, the present disclosure discloses a protective film assembly, applied to an electrode assembly of an energy storage device and including an insulation sheet used for wrapping the electrode assembly, wherein the insulation sheet is arranged between a housing and the electrode assembly of the energy storage device; the insulation sheet is integrated and is provided with a plurality of fold structures; the fold structures divide the insulation sheet into: a bottom surface covering region, clinging to a bottom of the electrode assembly; a main surface covering region, connected to the bottom surface covering region and clinging to a main surface of the electrode assembly; a first side surface covering region, including a first covering sub-region and a second covering sub-region, wherein the first covering sub-region and the second covering sub-region are connected to one side of the main surface covering region; the first covering sub-region and the second covering sub-region overlap after being bent along the fold structures, and cling to a first side surface of the electrode assembly perpendicular to the main surface; and a second side surface covering region, including a third covering sub-region and a fourth covering sub-region, wherein the third covering sub-region and a fourth covering sub-region are connected to the other side of the main surface covering region; the third covering sub-region and a fourth covering sub-region overlap after being bent along the fold structures, and cling to a second side surface of the electrode assembly perpendicular to the main surface; the first side surface and the second side surface are oppositely arranged; a maximum size of the first covering sub-region in a first direction is equal to a maximum size of the second covering sub-region in the first direction, and a maximum size of the first covering sub-region in the second direction is equal to a maximum size of the second covering sub-region in the second direction; the first direction is a thickness direction of the electrode assembly; and the second direction is a height direction of the electrode assembly.

Optionally, the bottom surface covering region satisfies: 273 mm≤L1≤277 mm, and 55.5 mm≤H1≤59.5 mm L1 is a length of the bottom surface covering region.

H1 is a width of the bottom surface covering region.

Optionally, the bottom surface covering region satisfies: 1.03≤P1/L1≤1.06, and 1.03≤Q1/H1≤1.06.

P1 is a length of the electrode assembly.

Q1 is a thickness of the electrode assembly.

A lengthwise direction of the bottom surface covering region and a lengthwise direction of the electrode assembly are both along a third direction, and a width direction of the bottom surface covering region and a thickness direction of the electrode assembly both face the first direction.

Optionally, the bottom surface covering region satisfies: 0.19≤H1/L1≤0.21.

Optionally, a maximum size of the third covering sub-region in the first direction is equal to a maximum size of the fourth covering sub-region in the first direction, and a maximum size of the third covering sub-region in the second direction is equal to a maximum size of the fourth covering sub-region in the second direction.

Optionally, one side of the first covering sub-region close to the second covering sub-region is provided with a chamfer structure, and/or one side of the third covering sub-region close to the fourth covering sub-region is provided with a chamfer structure.

Optionally, the fold structures include a plurality of through holes; the plurality of through holes are arranged in sequence along a fold forming direction of the fold structures;

Optionally, a plurality of through holes can be arranged in rows along the fold forming direction, and the fold structures may include one or two rows of through holes.

Optionally, the through hole satisfies:

0.7 mm≤$L_3$≤1.3 mm, and 0.06 mm≤$H_3$≤0.21 mm,

L3 is a length of the through hole, and H3 is a width of the through hole.

Optionally, the through hole satisfies: 0.7 mm≤L4≤0.9 mm; and L4 is a size of a spacing between adjacent through holes.

Optionally, the through hole satisfies: 1.2≤L3/L4≤1.3.

Optionally, a lengthwise direction of the through hole is parallel to the fold forming direction.

Optionally, the through hole satisfies: 9≤L3/H3≤11.

Optionally, the protective film assembly also include a bottom supporting plate, stacked on one surface of the bottom surface covering region close to the bottom of the electrode assembly.

Optionally, one side of the bottom supporting plate facing the bottom surface covering region is provided with a plurality of hot-melting portions;

the bottom supporting plate is connected to the insulation sheet through the plurality of hot-melting portions in a hot-melting manner.

Optionally, the hot-melting portion satisfies:

2.7 mm≤$M1$≤2.9 mm, and 13 mm≤$N1$≤13.6 mm

M1 is a width of the hot-melting portion, and N1 is a length of the hot-melting portion.

Optionally, the hot-melting portion satisfies 4.5≤N1/M1≤5.

Optionally, the hot-melting portion satisfies: 30 mm≤M2≤30.6 mm; and M2 is a size of a spacing between adjacent hot-melting portions.

Optionally, a width direction of the hot-melting portion is consistent with the lengthwise direction of the bottom surface covering region, and the plurality of hot-melting portions are disposed in sequence towards the lengthwise direction of the bottom surface covering region; and a lengthwise direction of the hot-melting portion is consistent with the width direction of the bottom surface covering region.

Optionally, the hot-melting portion satisfies: 0.08≤M1/M2≤0.1.

Optionally, the insulation sheet is provided with a first permeable hole, and the bottom supporting plate is provided with a second permeable hole; the first permeable hole is in communication with the second permeable hole; and an opening area of the first permeable hole is larger than an opening area of the second permeable hole.

Optionally, the bottom supporting plate is provided with a plurality of notches; the notches are arranged at an edge of the bottom supporting plate; and the notches are used for communication with an inner cavity of the housing.

Optionally, a projection area of the bottom supporting plate along the height direction of the electrode assembly is smaller than a projection area of the bottom surface covering region along the height direction of the electrode assembly.

Optionally, the bottom supporting plate satisfies:

268 mm≤$L2$≤272 mm, and 55 mm≤$H2$≤55.6 mm

L2 is a length of the bottom supporting plate, and H2 is a width of the bottom supporting plate; the lengthwise direction of the bottom supporting plate is consistent with the lengthwise direction of the bottom surface covering region; and the width direction of the bottom supporting plate is consistent with the width direction of the bottom surface covering region.

Optionally, the bottom supporting plate satisfies: 0.19≤H2/L2≤0.21.

Optionally, the bottom supporting plate satisfies: 1.01≤L1/L2≤1.03, and 1.01≤H1/H2≤1.03.

Optionally, the bottom supporting plate satisfies: 0.19≤H2/L2≤0.21.

Optionally, the notch satisfies: 79.6 mm≤M3≤80 mm, and 6.5 mm≤N3≤7.5 mm

M3 is a length of the notch, and N3 is a width of the notch.

Optionally, the plurality of notches are disposed in sequence along the lengthwise direction of the bottom supporting plate; and the lengthwise direction of the notch is consistent with the lengthwise direction of the bottom supporting plate.

Optionally, the notch satisfies: 0.45≤M3/L2≤0.5.

Optionally, the notch satisfies: 49.2 mm≤M4≤50.2 mm M4 is a size of a spacing between adjacent notches.

Optionally, the notch satisfies: 1.4≤M3/M4≤1.8.

The present disclosure further discloses another protective film assembly, applied to an electrode assembly of an energy storage device and including an insulation sheet used for wrapping the electrode assembly, wherein the insulation sheet is arranged between a housing and the electrode assembly of the energy storage device; the insulation sheet is integrated and is provided with a plurality of fold structures; the fold structures divide the insulation sheet into: two main surface covering regions, clinging a main surface of the electrode assembly; a first side surface covering region, including a first covering sub-region, a fifth covering sub-region and a second covering sub-region which are arranged in sequence, wherein one of the two main surface covering regions is connected between the first covering sub-region and the fifth covering sub-region, and the other main surface covering region is connected between the fifth covering sub-region and the second covering sub-region; and a bottom surface covering region, clinging a bottom of the electrode assembly, wherein the bottom surface covering region is connected to one of the two main surface covering regions; the first covering sub-region and the second covering sub-region overlap each other after being bent along the fold structures and cling to a first side surface of the electrode assembly perpendicular to the main surface; the fifth covering sub-region cling to a second side surface of the electrode assembly perpendicular to the main surface after being folded along the fold structures; the first side surface and the second side surface are oppositely arranged; a maximum size of the first covering sub-region in the first direction, a maximum size of the second covering sub-region in the first direction, and a maximum size of the fifth covering sub-region in the first direction are equal; a maximum size of the first covering sub-region in the second direction, a maximum size of the second covering sub-region in the second direction, and a maximum size of the fifth covering sub-region in the second direction are equal; and the first direction is the thickness direction of the electrode assembly, and the second direction is the height direction of the electrode assembly.

In a second aspect, the present disclosure discloses an energy storage device, including a housing, an electrode assembly, an end cover assembly, and the protective film assembly, the insulation sheet and the electrode assembly are both accommodated in an inner cavity of the housing;

the end cover assembly is connected to one side of the electrode assembly facing away from the bottom surface covering region, and airtightly covers an opening of the housing.

Compared with the prior art, the present disclosure has the beneficial effects below: In the present disclosure, by means of structural optimization for the protective film assembly, the protective film assembly specifically includes: an insulation sheet provided with a plurality of fold structures. The fold structures divide the insulation sheet into a bottom surface covering region, a main surface covering region, a first side surface covering region and a second side surface covering region. The insulation sheet can be bent by means of the fold structures, so that the protective film assembly is enclosed into a protective cover for covering the electrode assembly. When the protective film assembly is enclosed into the protective cover: the bottom surface covering region is a bottom wall of the protective cover to cover the bottom surface of the electrode assembly; the main surface covering region and the first side surface covering region are enclosed into a circumferential wall of the protective cover to cover the side surfaces of the electrode assembly; the second side surface covering region is adhered to a surface of the first side surface covering region facing away from the electrode assembly; and furthermore, the maximum size of the second side surface covering region towards the first direction is equal to the maximum size of the first side surface covering region towards the first direction, and the maximum size of the second side surface covering region towards the second direction is equal to the maximum size of the first side surface covering region towards the second direction. The maximum size of the third covering sub-region towards the first direction is equal to the maximum size of the fourth covering sub-region towards the first direction, and the maximum size of the third covering sub-region towards the second direction is equal to the maximum size of the fourth covering sub-region towards the second direction. The first direction is a width direction of the electrode assembly, and the second direction is a height direction of the electrode assembly.

It can be seen that, in the first aspect, the insulation sheet in the present disclosure is integrated, which is convenient for bending and bonding. By means of integration, the insulation sheet can be bent to form a protective cover, so that the possibility of reserving gaps at edges of the protective cover, thereby improving the wrapping effect on the electrode assembly.

In the second aspect, the first covering sub-region and the second covering sub-region cling to one side of the main surface covering region, and the third covering sub-region and the fourth covering sub-region cling to the other side of the main surface covering region, so that the insulation sheet has more bonding positions after being bent, thereby obtaining a larger bonding area, and improving the wrapping effect on the electrode assembly.

In the third aspect, by means of size control of the second side surface covering region and the first side surface covering region, the matching degree between the first covering sub-region and the second covering sub-region, and the matching degree between the third covering sub-region and the fourth covering sub-region are increased, in this way, a large bonding area can be ensured between the first covering sub-region and the second covering sub-region, and between the third covering sub-region and the fourth covering sub-region, so as to ensure the structural stability of the formed protective cover, thus ensuring a good insulation effect and improving the safety performance of the energy storage device.

In the fourth aspect, due to the high matching degree between the first covering sub-region and the second covering sub-region, as well as between the third covering sub-region and fourth covering sub-region, no materials will be wasted in the first covering sub-region and the second covering sub-region, the third covering sub-region and the fourth covering sub-region, which saves the material cost.

To sum up, the protective film assembly of the present disclosure can reduce the cost, improve the efficiency and improve insulation performance.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF EMBODIMENTS

Figure 1:
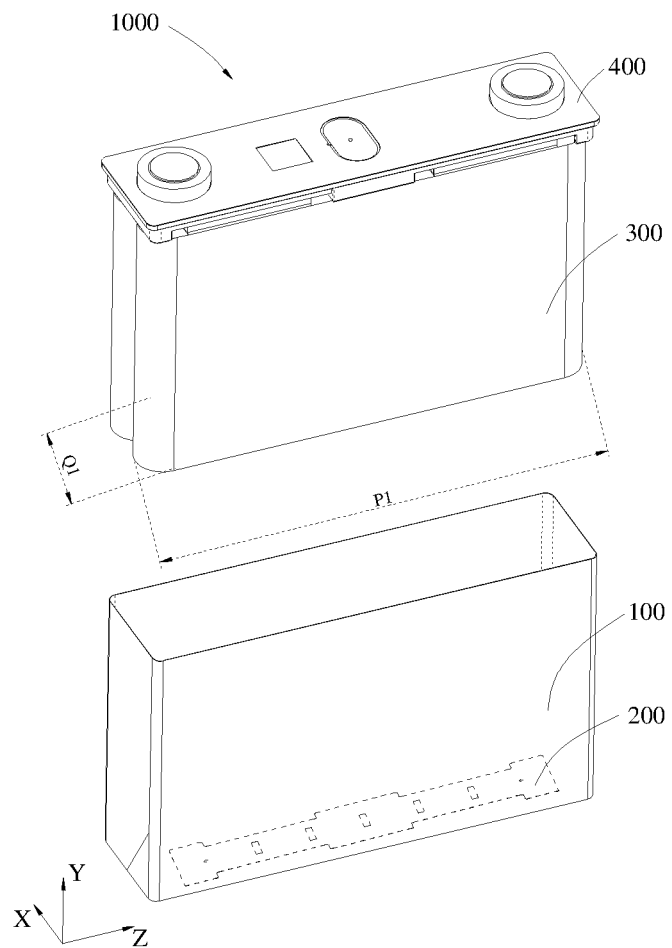
FIG. 1 is an exploded diagram of an energy storage device disclosed by the present disclosure.

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

In the present disclosure, The terms "upper", "lower", "left", "right", "front", "rear", "top", "bottom", "inner", "outer", "middle", "vertical", "horizontal", "transverse", "longitudinal", and the like indicate azimuth or positional relationships based primarily on the azimuth or positional relationships shown in the drawings, Not intended to define the indicated device, element or component must have a particular orientation, or be constructed and operated in a particular orientation.

Furthermore, the above-described partial terms may be used in addition to indicating azimuth or positional relationships. It may also be used to refer to other meanings, such as the term "above" in some cases may also be used to refer to certain dependencies or connectivity. The specific meanings of these terms in the present disclosure will be understood by those of ordinary skill in the art as the case may be.

In addition, the terms "mounted", "disposed", "provided", "connected", "connected", and "socket" are to be construed broadly to mean, for example, a fixed connection, a detachable connection, or an integral construction; It may be a mechanical connection, or an electrical connection; The specific meaning of the above-mentioned terms in the present disclosure will be understood by those of ordinary skill in the art as the case may be, either directly, or indirectly, via an intermediate medium, or internal communication between two devices, elements, or components.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

In the relevant technology, an outer surface of an electrode assembly will be covered with a layer of insulation sheet to achieve insulation, collision prevention and other protections for the electrode assembly. However, the insulation sheet has a limited bonding area, so the bonding strength of a bonding position of the bent insulation sheet is low, leading to an easy bonding failure. As a result, the electrode assembly fails to be covered, and the safety performance of the energy storage device is reduced. The objective of the present disclosure is to solve this problem, which will be described in detail below.

Figure 2:
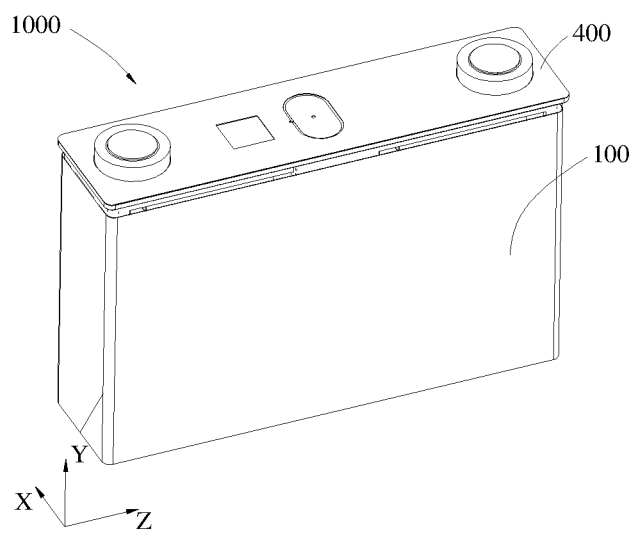
FIG. 2 is a combined diagram of an energy storage device disclosed by the present disclosure.

Referring to FIG. 1 and FIG. 2, the present disclosure discloses an energy storage device 1000, including a housing, an electrode assembly 300, an end cover assembly 400, and a protective film assembly. The insulation sheet 100 wraps the electrode assembly 300. The insulation sheet 100 and the electrode assembly 300 are both accommodated in an inner cavity of the housing. The end cover assembly 400 is connected to one side of the electrode assembly 300 facing away from a bottom surface covering region 140 below, so that the energy storage device can realize electrical conduction, and the end cover assembly 400 covers an opening of the housing to seal the energy storage device.

The energy storage device 1000 may include, but is not limited to, a battery cell, a battery module, a battery pack, a battery system, etc. When the energy storage device 1000 is a battery cell, it may be a square or cylindrical battery.

In the above structure, insulation protection for the electrode assembly 300 can be realized by covering the electrode assembly 300 with the insulation sheet 100. The structure of the protective film module will be described in detail below.

Referring to FIG. 3 to FIG. 9, the present disclosure discloses a protective film assembly applied to the electrode assembly 300 of the energy storage device, and including an insulation sheet 100. The insulation sheet 100 is used for wrapping the electrode assembly 300. The insulation sheet 100 is arranged between the housing of the energy storage device and the electrode assembly 300 to provide insulation protection. The insulation sheet 100 is integrated to facilitate bending.

The insulation sheet 100 may be provided with a plurality of fold structures 150. The fold structures 150 divide the insulation sheet 100 into a bottom surface covering region 140, a main surface covering region 110, a first side surface covering region 120 and a second side surface covering region 130. The insulation sheet 100 can be bent through the fold structures 150 to enclose the protective film assembly into a protective cover for wrapping the electrode assembly 300.

The bottom surface covering region 140 clings to a bottom of the electrode assembly 300. The main surface covering region 110 is connected to the bottom surface covering region 140, and the main surface covering region 110 clings to a main surface of the electrode assembly 300.

The first side surface covering region 120 includes a first covering sub-region 121 and a second covering sub-region 122. The first covering sub-region 121 and the second covering sub-region 122 are connected to one side of the main surface covering region 110. The first covering sub-region 121 and the second covering sub-region 122 overlap after being bent along the fold structures 150, and cling to a first side surface of the electrode assembly 300 that is perpendicular to the main surface.

The second side surface covering region 130 includes a third covering sub-region 131 and a fourth covering sub-region 132. The third covering sub-region 131 and the fourth covering sub-region 132 are connected to the other side of the main surface covering region 110. The third covering sub-region 131 and the fourth covering sub-region 132 overlap after being bent along the fold structures 150, and cling to a second side surface of the electrode assembly 300 that is perpendicular to the main surface.

Furthermore, the maximum size of the first covering sub-region 121 towards a first direction X is equal to the maximum size of the second covering sub-region 122 towards the first direction X. The maximum size of the first covering sub-region 121 towards a second direction Y is equal to the maximum size of the second covering sub-region 122 towards the second direction Y. The first direction X is a thickness direction of the electrode assembly 300, and the second direction Y is a height direction of the electrode assembly 300. In this way, an area and shape of the first covering sub-region 121 are basically the same as those of the second covering sub-region 122.

Generally, a surface of the electrode assembly 300 includes a bottom surface and a circumferential surface. The circumferential surface also includes narrow surfaces and a main surface. The narrow surfaces include the first side surface and the second side surface above, and an area of each narrow surface is smaller than that of the main surface. The insulation sheet 100 should match the electrode assembly 300. That is, the shape and area of the main surface covering region 110 are basically the same as those of the main surface. The areas and shapes of the first covering sub-region 121 and the second covering sub-region 122 are basically the same as those of the first side surface. The areas and shapes of the third covering sub-region 131 and the fourth covering sub-region 132 are basically the same as those of the second side surface. The area and shape of the bottom surface covering region 140 are basically the same as those of the bottom surface. In this way, the insulation sheet 100 can achieve perfect wrapping on the electrode assembly 300.

It can be seen that, in the first aspect, the insulation sheet 100 in the present disclosure is integrated, which is convenient for bending and bonding. By means of integration, the insulation sheet 100 can be bent to form a protective cover, so that the possibility of reserving gaps at edges of the protective cover, thereby improving the wrapping effect on the electrode assembly 300.

In the second aspect, the first covering sub-region 121 and the second covering sub-region 122 cling to one side of the main surface covering region 110, and the third covering sub-region 131 and the fourth covering sub-region 132 cling to the other side of the main surface covering region 110, so that the insulation sheet 100 has more bonding positions after being bent, thereby obtaining a larger bonding area, and improving the wrapping effect on the electrode assembly 300.

In the third aspect, by means of size control of the first covering sub-region 121 and the second covering sub-region 122, the matching degree between the first covering sub-region 121 and the second covering sub-region 122 is increased. In this way, a large bonding area can be ensured between the first covering sub-region 121 and the second covering sub-region 122, so as to ensure the structural stability of the formed protective cover, thus ensuring a good insulation effect and improving the safety performance of the energy storage device.

In the fourth aspect, due to the high matching degree between the first covering sub-region 121 and the second covering sub-region 122, no materials will be wasted in the first covering sub-region 121 and the second covering sub-region 122, which saves the material cost.

To sum up, the protective film assembly of the present disclosure can reduce the cost, improve the efficiency and improve insulation performance.

Optionally, according to a requirement for the shape of the electrode assembly 300, the bottom surface covering region 140 can be set to satisfy:

273 mm≤$L1$≤277 mm, such as $L1$=273 mm, 275.07 mm, and 277 mm, preferably $L1$=275.07 mm;

55.5 mm≤$H1$≤59.5 mm, such as $H1$=55.5 mm, 57.51 mm, and 59.5 mm, preferably $H1$=57.51 mm $L1$ is a length of the bottom surface covering region 140. $H1$ is a width of the bottom surface covering region 140. Such length and width of the bottom surface covering region 140 can maintain a high matching degree with the electrode assembly 300, so that the wrapping effect on the electrode assembly 300 is improved.

Optionally, the bottom surface covering region 140 satisfies:

1.03≤$P1/L1$≤1.06, such as $P1/L1$=1.03, 1.05, 1.06.

1.03≤$Q1/H1$≤1.06, such as $Q1/H1$=1.03, 1.05, 1.06.

$P1$ is a length of the electrode assembly 300. $Q1$ is a thickness of the electrode assembly 300. A lengthwise direction of the bottom surface covering region 140 and a lengthwise direction of the electrode assembly 300 are both along a third direction Z, and a width direction of the bottom surface covering region 140 and a thickness direction of the electrode assembly 300 both face the first direction X.

If the bottom surface covering region 140 is much smaller than the electrode assembly 300, it is not conducive to the wrapping of the electrode assembly 300. If the bottom surface covering region 140 is much larger than the electrode assembly 300, it will lead to material waste, and there is a space between the bottom surface covering region and the electrode assembly 300, affecting the wrapping effect. Therefore, the design is made according to the above size proportions, which further increases the matching degree with the electrode assembly 300. It can not only ensure the wrapping effect on the electrode assembly 300, but also help to save the material cost.

Optionally, the bottom surface covering region 140 satisfies: 0.19≤$H1/L1$≤0.21, such as $H1/L1$=0.19, 0.2, 0.21.

Such a length-to-width ratio of the bottom surface covering region 140 has a good fitness with the electrode assembly 300 of a square energy storage device and a housing of the square energy storage device. It is suitable for wrapping the electrode assembly 300 of the square energy storage device. After the electrode assembly 300 is wrapped, the whole is also easily put into the housing of the square energy storage device to improve the assembling efficiency.

Optionally, the maximum size of the third covering sub-region 131 towards the first direction X is equal to the maximum size of the fourth covering sub-region 132 towards the first direction X, and the maximum size of the third covering sub-region 131 towards the second direction Y is equal to the maximum size of the fourth covering sub-region 132 towards the second direction Y. The first direction X is the thickness direction of electrode assembly 300, and the second direction Y is the height direction of electrode assembly 300. In this way, an area and shape of the third covering sub-region 131 are basically the same as those of the fourth covering sub-region 132.

In this way, by means of size control of the third covering sub-region 131 and the fourth covering sub-region 132, the matching degree between the third covering sub-region 131 and the fourth covering sub-region 132 is increased. In this way, a large bonding area can be ensured between the third covering sub-region 131 and the fourth covering sub-region 132, so as to further ensure the structural stability of the formed protective cover, thus better ensuring a good insulation effect and improving the safety performance of the energy storage device.

At the same time, due to the high matching degree between the third covering sub-region 131 and the fourth covering sub-region 132, no materials will be wasted in the third covering sub-region 131 and the fourth covering sub-region 132, which saves the material cost.

A specific bending method for the above insulation sheet 100 is as follows:

The bottom surface covering region 140 clings to the bottom of the electrode assembly 300.

Two main surface covering regions 110 are bent 90° relative to the bottom surface covering region 140 in a face-to-face manner, and cling to the main surface of the electrode assembly 300.

The first covering sub-region 121 and the second covering sub-region 122 are then bent 90° along the fold structures 150, and overlap each other to cling to the first side surface of the electrode assembly 300.

The third covering sub-region 131 and the fourth covering sub-region 132 are then bent 90° along the fold structures 150, and overlap each other to cling to the second side surface of the electrode assembly 300.

So far, the insulation sheet 100 is bent into a protective cover to wrap the bottom surface, main surface, first side surface and second side surface of the electrode assembly 300. Only two gaps are reserved in the protective cover formed after the insulation sheet 100 is bent. The two gaps are respectively located at an intersection of the first side surface covering region 120 and the bottom surface covering region 140 and at an intersection of the second side surface covering region 130 and the bottom surface covering region 140, and are disposed towards the third direction Z. The third direction Z is the lengthwise direction of the electrode assembly 300. In this way, the sealing effect on the protective cover is good.

Optionally, one side of the first covering sub-region 121 close to the second covering sub-region 122 is provided with a chamfer structure, and/or one side of the third covering sub-region 131 close to the fourth covering sub-region 132 is provided with a chamfer structure, which can achieve a fool-proofing effect. Specifically, in the bending process of the insulation sheet 100, the second covering sub-region 122 first cling to the first side surface of the electrode assembly 300, and the first covering sub-region 121 then cling to one side of the second covering sub-region 122 facing away from the electrode assembly 300. Similarly, the fourth covering sub-region 132 first cling to the second side surface of the electrode assembly 300, and the third covering sub-region 131 then cling to the one side of the fourth covering sub-region 132 facing away from the electrode assembly 300.

It can be seen that the chamfer structures are designed to distinguish the first covering sub-region 121 from the second covering sub-region 122 and distinguish the third covering sub-region 131 from the fourth covering sub-region 132, so as to prevent disordered bonding of the covering sub-regions during bending.

Optionally, for a specific form of the fold structures 150, the fold structures 150 may include a plurality of through holes 151. The plurality of through holes 151 are arranged in sequence along a fold forming direction of the fold structures 150. This material removal method makes it easy to bend the positions where the fold structures 150 are located, thereby reducing the difficulty of forming the protective cover by the insulation sheet 100 and improving the operability of bending. Optionally, the fold structures 150 may also be scratches, etc., which will not be detailed here.

Optionally, a plurality of through holes 151 can be arranged in rows along the fold forming direction, and the fold structures 150 may include one or two rows of through holes 151.

The number of columns of through holes 151 in the fold structures 150 matches the shape of corners of the electrode assembly 300. Specifically, when the corners are intersections between the bottom surface and the main surface, the first side surface, the second side surface of the electrode assembly 300. The corners usually have sharp edges. Therefore, the fold structures 150 adjacent to the main surface covering region 110 can be provided with only one column of through holes 151 to correspond to the corners of the sharp edge structure of the electrode assembly 300.

When the corners are intersections between the main surface and the first side surface, the second side surface of electrode assembly 300. The corners are usually rounded, so the fold structures 150 adjacent to the first covering sub-region 121, the second covering sub-region 122, the third covering sub-region 131 and the fourth covering sub-region 132 can be provided with two rows of through holes 151. In this way, during bending, the positions of the two rows of through holes 151 can be bent into rounded corners to better wrap the corners of the rounded structure of the electrode assembly 300.

Optionally, each through hole 151 may be a round hole, an elliptical hole or holes of other shapes. In the present disclosure, the through hole 151 is a rectangular hole. Specifically, the through hole 151 satisfies:

0.7 mm≤$L3$≤1.3 mm, such as $L3$=0.7 mm, 1 mm, and 1.3 mm, preferably $L3$=1 mm 0.06 mm≤$H3$≤0.21 mm, such as $H3$=0.06 mm, 0.1 mm, and 0.21 mm, preferably $H3$=0.1 mm L3 is a length of the through hole 151, and H3 is a width of the through hole 151.

If an opening area of the through hole 151 is too large, the electrode assembly 300 will be exposed too much, which will affect the insulation protection effect. If the opening area of the through hole 151 is too small, it is not conducive to bending. Therefore, the opening area is controlled according to the above sizes, which can not only ensure the wrapping of the electrode assembly 300, but also facilitate the insulation sheet 100 to be bent.

Optionally, a lengthwise direction of the through hole 151 may be parallel to the fold forming direction, so that while the fold structures 150 are easy to bend, a total area of the holes formed in the fold structures 150 is small, so as to reduce the exposure of the electrode assembly 300.

Optionally, the through hole 151 satisfies: 9≤$L3/H3$≤11, such as $L3/H3$=9, 10, 11. By means of controlling the length-width ratio of the through hole 151, the shape of the through hole 151 is further controlled, so as to give better consideration to the wrapping performance for the electrode assembly 300 and the bending performance of the insulation sheet 100.

Optionally, the through hole 151 satisfies: 0.7 mm≤$L4$≤0.9 mm, such as $L4$=0.7 mm, 0.8 mm, and 0.9 mm, preferably $L4$=0.8 mm L4 is a size of a spacing between adjacent through holes 151. By means of controlling the size of the spacing, the layout density of the through holes 151 is adjusted to further control and adjust the bending performance of the insulation sheet 100 and the wrapping performance for the electrode assembly 300.

Optionally, the through hole 151 satisfies: 1.2≤$L3/L4$≤1.3, such as $L3/L4$=1.2, 1.25, 1.3. By means of controlling the length/spacing ratio of the through hole 151, the density of the through holes 151 is adjusted to further control and adjust the bending performance of the insulation sheet 100 and the wrapping performance for the electrode assembly 300, so that the two performances are better considered.

Optionally, the protective film assembly may also include a bottom supporting plate 200. The bottom supporting plate 200 is stacked on one surface of the bottom surface covering region 140 close to the bottom of the electrode assembly 300, such as one surface of the bottom surface covering region 140 facing away from the electrode assembly 300. In this setting, the bottom supporting plate 200 has the function of supporting the bottom, so that the protective cover formed by the protective film assembly has better structural stability, thereby improving the wrapping effect.

Optionally, one side of the bottom supporting plate 200 facing the bottom surface covering region 140 can be provided with a plurality of hot-melting portions 210, and the bottom supporting plate 200 can be connected with the insulation sheet 100 through the plurality of hot-melting portions 210 in a hot-melting manner to improve the connection stability. The hot-melting portions 210 may be of groove structures, so that it is hard for formed molten points to protrude, thereby avoiding interference with the installation of the electrode assembly 300 and avoiding the risk such as short circuit.

Optionally, the hot-melting portion 210 satisfies:

2.7 mm≤$M1$≤2.9 mm, such as $M1$=2.7 mm, 2.8 mm, and 2.9 mm, preferably $M1$=2.8 mm 13 mm≤$N1$≤13.6 mm, such as $N1$=13.32 mm, 13 mm, and 13.6 mm, preferably $N1$=13.32 mm M1 is a width of the hot-melting portion 210, and N1 is a length of the hot-melting portion 210.

If an arrangement region of the hot-melting portions 210 is too small, it is not conducive to achieving hot-melting connection, which will affect the connection stability. If the arrangement region of the hot-melting portions 210 is too large, it is not conducive to the structural stability of the bottom supporting plate 200. Therefore, the arrangement region is controlled according to the above sizes, which can ensure the stability of hot-melting connection and also ensure the sufficient strength of the bottom supporting plate 200.

Optionally, the hot-melting portion 210 satisfies: $4.5 \leq N1/M1 \leq 5$, such as N1/M1=4.5, 4.7, 5. By means of controlling the length-to-width ratio of the hot-melting portion 210, the shape of the hot-melting portion 210 is further controlled, which is more suitable for the hot-melting connection between the insulation sheet 100 and the bottom supporting plate 200 in the square energy storage device.

Optionally, too dense hot-melting portions 210 will affect the structural stability of the bottom supporting plate 200, while too sparse hot-melting portions 210 will reduce the hot-melting stability between the insulation sheet 100 and the bottom supporting plate 200. Therefore, the hot-melting portion 210 can be set to satisfy: 30 mm≤M2≤30 6 mm, such as M2=30 mm, 30.35 mm, and 30.6 mm, preferably M2=30.35 mm M2 is a size of a spacing between adjacent hot-melting portions 210. By means of controlling the spacing between the hot-melting portions 210, the bottom supporting plate 200 gives consideration to both the hot-melting stability and the structural stability.

Optionally, a width direction of the hot-melting portion 210 can be consistent with the lengthwise direction of the bottom supporting plate 200 and the lengthwise direction of the bottom surface covering region 140, and the plurality of hot-melting portions 210 may be disposed in sequence towards the lengthwise direction of the bottom surface covering region 140. A lengthwise direction of the hot-melting portion 210 may be consistent with the width direction of the bottom supporting plate 200 and the width direction of the bottom surface covering region 140. In this way, the hot-melting portion 210 clings more firmly to the bottom surface covering region 140 in both the lengthwise and width directions.

Optionally, the hot-melting portion 210 satisfies: $0.08 \leq M1/M2 \leq 0.1$, such as M1/M2=0.08, 0.09, 0.1. By means of controlling the width-to-spacing ratio of the hot-melting portion 210, the density of the hot-melting portions 210 is adjusted to further enable the bottom supporting plate 200 to give consideration to both the hot-melting stability and the structural stability.

Optionally, the insulation sheet 100 can be provided with a first permeable hole 160, and the bottom supporting plate 200 can be provided with a second permeable hole 220. A forming direction of the first permeable hole 160 points to the electrode assembly 300. The second permeable hole 220 is communicated to the first permeable hole 160. An opening area of the first permeable hole 160 is larger than that of the second permeable hole 220. In this setting, the first permeable hole 160 and the second permeable hole 220 can cooperate with each other. Gas and liquid generated by expansion of the electrode assembly 300 are discharged in time to further improve the safety performance of the energy storage device.

Optionally, a projection of the second permeable hole 220 formed on the insulation sheet 100 can be located in the first permeable hole 160, that is, the opening area of the second permeable hole 220 is smaller than or equal to that of the first permeable hole 160. In this way, dislocation between the second permeable hole 220 and the first permeable hole 160 can be avoided, thus ensuring the circulation area. The circulation smoothness can be improved, thus improving the discharging performance for the gas and liquid generated by the expansion of the electrode assembly 300.

Optionally, a projection area of the bottom supporting plate 200 along the height direction of the electrode assembly 300 is smaller than that of the bottom surface covering region 140 along the height direction of the electrode assembly 300. It can be seen that the height direction of the electrode assembly 300 is the second direction Y, which is also a direction in which the electrode assembly 300 is installed into the housing. The area of the bottom supporting plate 200 is slightly smaller than that of the bottom surface covering region 140, so as to ensure the supporting function of the bottom supporting plate 200 to the bottom surface covering region 140. It is also convenient to mount the electrode assembly 300, the bottom supporting plate 200 and the insulation sheet 100 into the housing of the energy storage device, thus improving the assembling efficiency of the energy storage device.

Optionally, the bottom supporting plate 200 satisfies:

268 mm≤$L2$≤272 mm, such as $L2$=270 mm, 268 mm, and 272 mm, preferably $L2$=270 mm 55 mm≤$H2$≤55.6 mm, such as $H2$=55.31 mm, 55 mm, and 55.6 mm, preferably $H2$=55.31 mm.

L2 is a length of the bottom supporting plate 200, and H2 is a width of the bottom supporting plate 200. The lengthwise direction of the bottom supporting plate 200 is consistent with the lengthwise direction of the bottom surface covering region 140. The width direction of the bottom supporting plate 200 is consistent with the width direction of the bottom surface covering region 140, so as to be more suitable for the square energy storage device. Specifically, the supporting reinforcement at the bottom surface covering region 140 is better achieved.

Optionally, the bottom supporting plate 200 satisfies: $0.19 \leq H2/L2 \leq 0.21$, such as H2/L2=0.19, 0.2, 0.21. By means of controlling the length-to-width ratio of the bottom supporting plate 200, the shape of the bottom supporting plate 200 is further controlled, so as to be more conductive to the supporting function of the square energy storage device.

Optionally, the bottom supporting plate 200 satisfies: $1.01 \leq L1/L2 \leq 1.03$, such as 11/L2=1.01, 1.02, 1.03. $1.01 \leq H1/H2 \leq 1.03$, such as H1/H2=1.01, 1.02, 1.03. As mentioned above, L1 is the length of the bottom surface covering region 140, and H1 is the width of the bottom surface covering region 140. In this way, by means of adjusting the length ratio and the width ratio of the bottom supporting plate 200 to the bottom surface covering region 140, the size of the bottom supporting plate 200 relative to the bottom surface covering region 140 is further controlled, so as to give better consideration to the supporting reinforcement performance and interference prevention performance of the bottom supporting plate 200, and avoid the interference between the bottom supporting plate 200 and edges, rounded corners and the like in the housing after the bottom supporting plate is mounted in the housing.

Optionally, the bottom supporting plate 200 may be provided with a plurality of notches 230. The notches 230 are arranged at an edge of the bottom supporting plate 200. The notches 230 are used for communication with the inner cavity of the housing. In this way, after the insulation sheet 100 is mounted in the housing, the bottom supporting plate 200 separates the bottom surface covering region 140 from a bottom of the housing, and electrolyte in the inner cavity of the housing can be stored in the notches 230.

Optionally, the notch 230 satisfies: 79.6 mm≤M3≤80 mm, such as M3=79.8 mm, 79.6 mm, and 80 mm, preferably M3=79.8 mm 6.5 mm≤N3≤7.5 mm, such as N3=7 mm, 6.5 mm, and 7.5 mm, preferably N3=7 mm M3 is a length of the notch 230, and N3 is a width of the notch 230.

In this way, it can be ensured that the notch 230 has a large enough opening area, so as to have a sufficient liquid storage capacity, and the overall structural strength of the bottom supporting plate 200 will not be affected due to extremely large notches 230.

Optionally, the plurality of notches 230 can be disposed in sequence along the lengthwise direction of the bottom supporting plate 200. The lengthwise direction of the notch 230 is consistent with the lengthwise direction of the bottom supporting plate 200, so that the bottom supporting plate 200 can be provided with more notches 230 to improve the liquid storage capacity.

Optionally, the notches 230 can be arranged on two opposite sides of the bottom supporting plate 200 toward the first direction X, so that the bottom supporting plate 200 can achieve higher liquid storage capacity.

Optionally, the notch 230 satisfies: 0.45≤M3/L2≤0.5, such as M3/L2=0.45, 0.47, 0.5. As mentioned above, L2 is the length of the bottom supporting plate 200. By means of adjusting the length ratio of the notch 230 to the bottom supporting plate 200, the density of the notches 230 in the bottom supporting plate 200 can be adjusted, so as to give better consideration to the liquid storage capacity of the notches 230 and the structural stability of the bottom supporting plate 200.

Optionally, the notch 230 satisfies: 49.2 mm≤M4≤50.2 mm, such as M4=49.72 mm, 49.2 mm, and 50.2 mm, preferably M4=49.72 mm M4 is a size of a spacing between adjacent notches 230. By means of controlling the size of the spacing, the density of the notches 230 in the bottom supporting plate 200 can be adjusted, so as to give better consideration to the liquid storage capacity of the notches 230 and the structural stability of the bottom supporting plate 200.

Optionally, the notch 230 satisfies: 1.4≤M3/M4≤1.8, such as M3/M4=1.4, 1.6, 1.8. By means of adjusting the length-to-spacing ratio of the notch 230, the proportion of the notches 230 in the lengthwise direction of the bottom supporting plate 200 can be adjusted, which further adjusts the density of the notches 230 in the bottom supporting plate 200, so that the liquid storage capacity of the notch 230 and the structural stability of the bottom supporting plate 200 can be better considered.

Optionally, the hardness of the bottom supporting plate 200 can be greater than that of the insulation sheet 100, which can further improve the structural stability of the protective cover formed by the protective film assembly.

Figure 10:
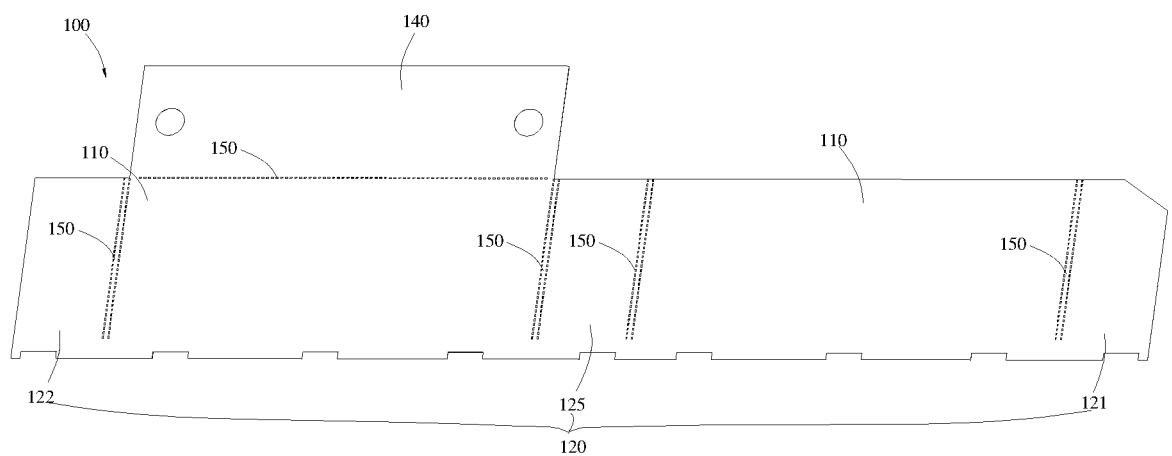
FIG. 10 is a structural diagram of a second kind of insulation sheet disclosed by the present disclosure.
Figure 11:
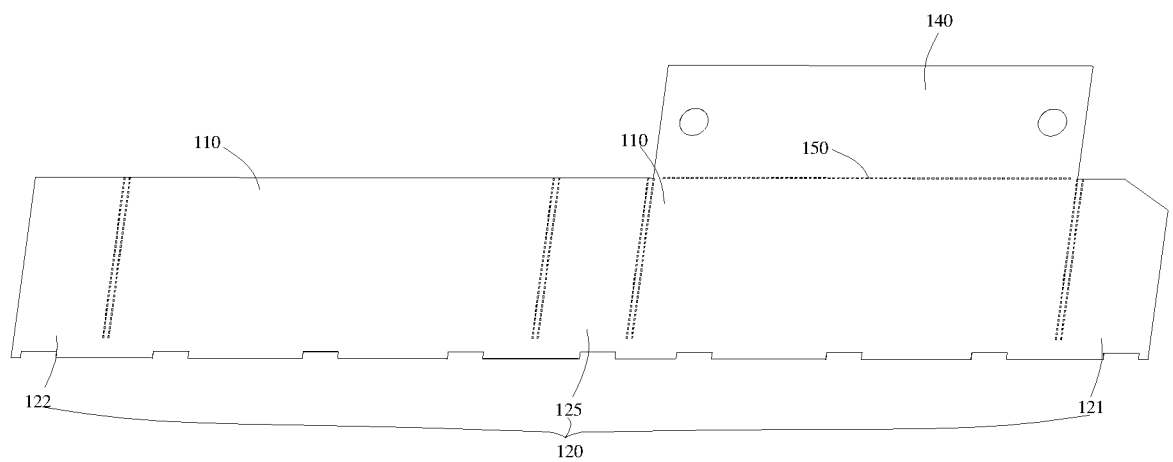
FIG. 11 is a structural diagram of a third kind of insulation sheet disclosed by the present disclosure.

Optionally, FIG. 10 and FIG. 11 are another two mirrored layout structures of the insulation sheet 100 of the present disclosure. Specifically, there are two main surface covering regions 110. The first side surface covering region 120 may include a first covering sub-region 121, a fifth covering sub-region 125 and a second covering sub-region 122 which are arranged in sequence. One of the two main surface covering regions 110 is connected between the first covering sub-region 121 and the fifth covering sub-region 125, and the other main surface covering region is connected between the fifth covering sub-region 125 and the second covering sub-region 122.

The bottom surface covering region 140 is connected to one of the two main surface covering regions 110. As shown in FIG. 10, the bottom surface covering region 140 is connected to the main surface covering region 110 between the fifth covering sub-region 125 and the second covering sub-region 122. Or, as shown in FIG. 11, the bottom surface covering region 140 is connected to the main surface covering region 110 between the fifth covering sub-region 125 and the first covering sub-region 121.

The first covering sub-region 121 and the second covering sub-region 122 overlap after being bent along the fold structures 150, and cling to the first side surface of the electrode assembly 300 perpendicular to the main surface. The fifth covering sub-region 125 is bent along the fold structures 150, and then cling to the second side surface of the electrode assembly 300 perpendicular to the main surface.

The maximum size of the first covering sub-region 121 towards the first direction X, the maximum size of the second covering sub-region 122 towards the first direction X, and the maximum size of the fifth covering sub-region 125 towards the first direction X are equal. The maximum size of the first covering sub-region 121 towards the second direction Y, the maximum size of the second covering sub-region 122 towards the second direction Y, and the maximum size of the fifth covering sub-region 125 towards the second direction Y are equal, and the second direction Y is the height direction of the electrode assembly 300.

Figure 3:
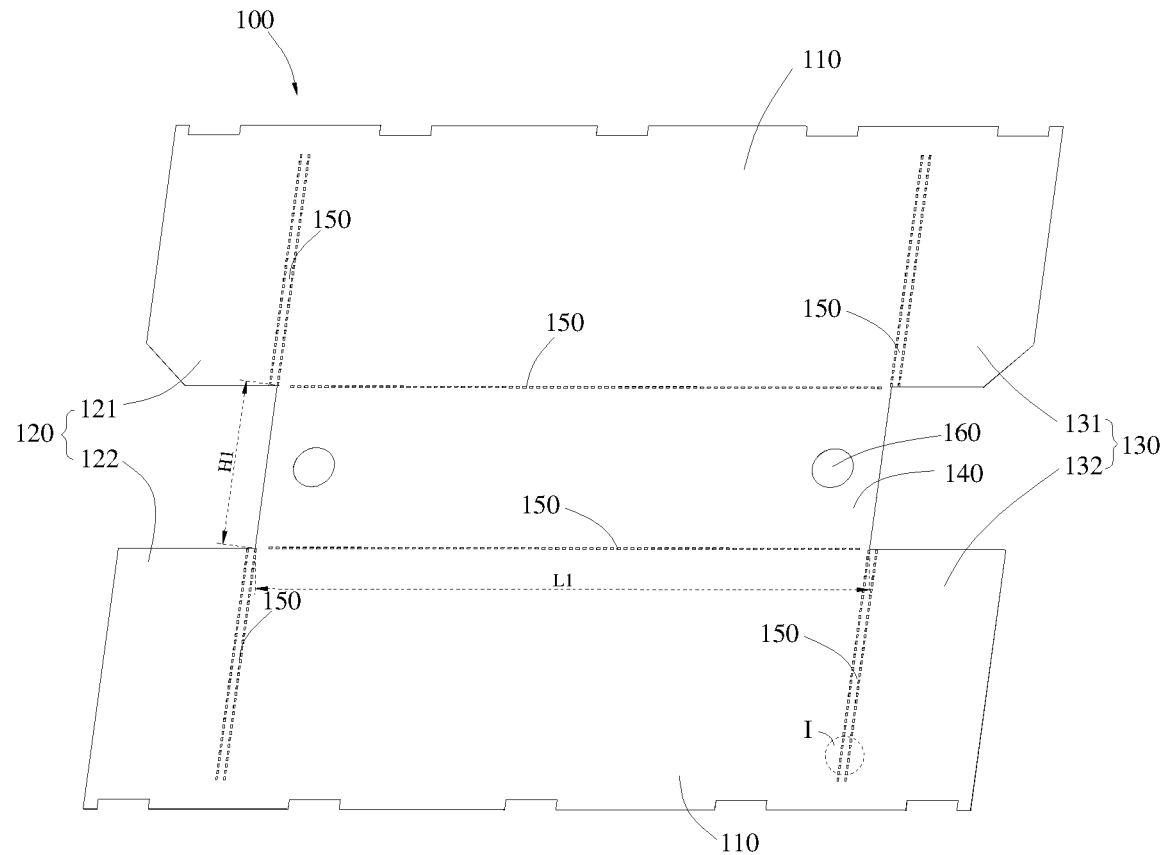
FIG. 3 is a structural diagram of a first kind of insulation sheet disclosed by the present disclosure.
Figure 4:
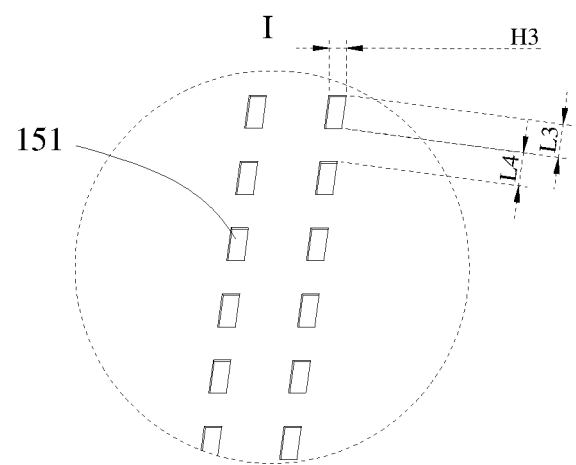
FIG. 4 is an enlarged diagram of part I of FIG. 3 disclosed by the present disclosure.
Figure 5:
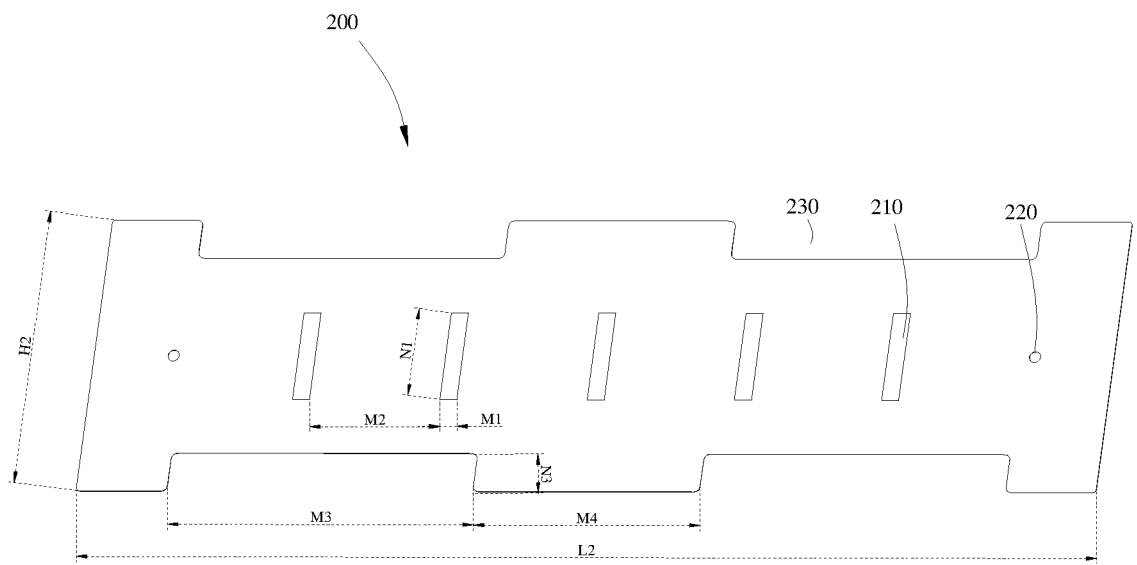
FIG. 5 is a structural diagram of a bottom supporting plate disclosed by the present disclosure.
Figure 6:
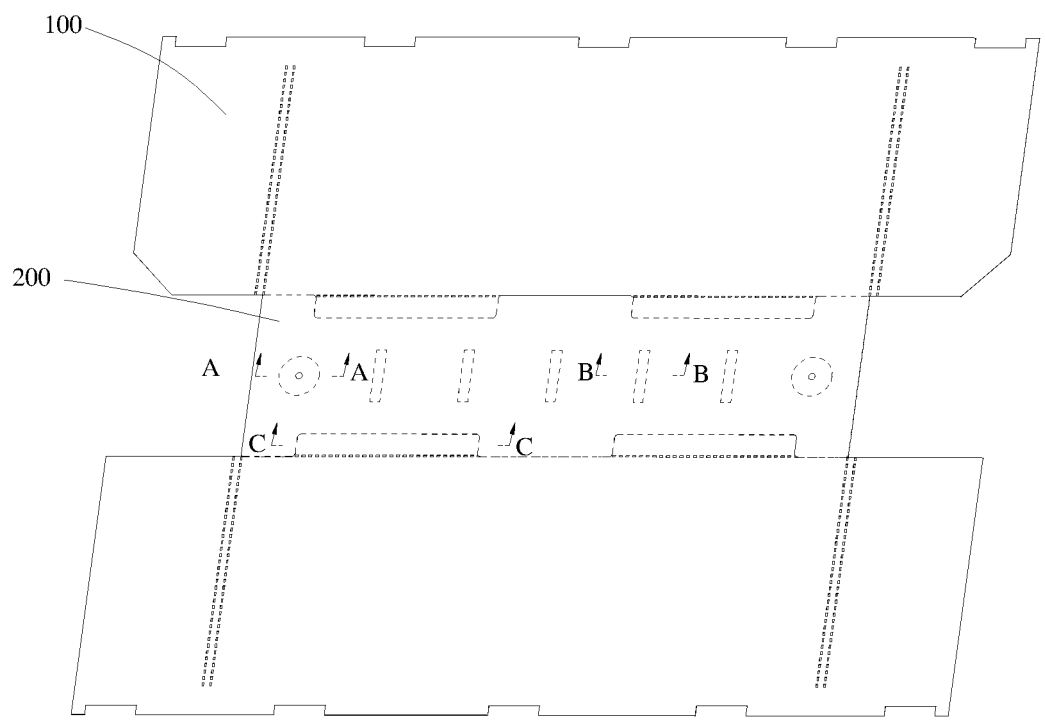
FIG. 6 is a combined structural diagram of an insulation sheet and a bottom supporting plate disclosed by the present disclosure.
Figure 7:
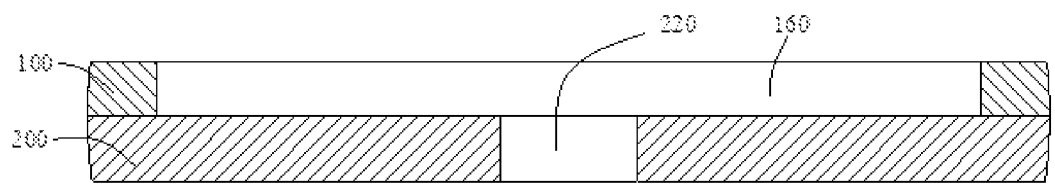
FIG. 7 is a sectional diagram along A-A in FIG. 6 disclosed by the present disclosure.
Figure 8:
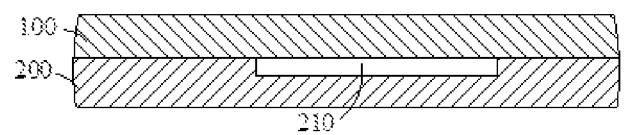
FIG. 8 is a sectional diagram along B-B in FIG. 6 disclosed by the present disclosure.
Figure 9:
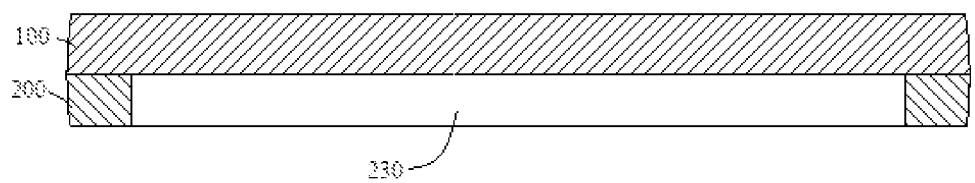
FIG. 9 is a sectional diagram along C-C in FIG. 6 disclosed by the present disclosure.

It can be seen that when the layout structures of the insulation sheet 100 in FIG. 10 and FIG. 11 are compared with the layout structure of the insulation sheet 100 in FIG. 3, the functions of the third covering sub-region 131 and the fourth covering sub-region 132 can be realized only with one fifth covering sub-region 125. This can reduce the materials used for bonding the electrode assembly 300, thus reducing the overall area of the insulation sheet 100 and saving the material cost.

Figure 12:
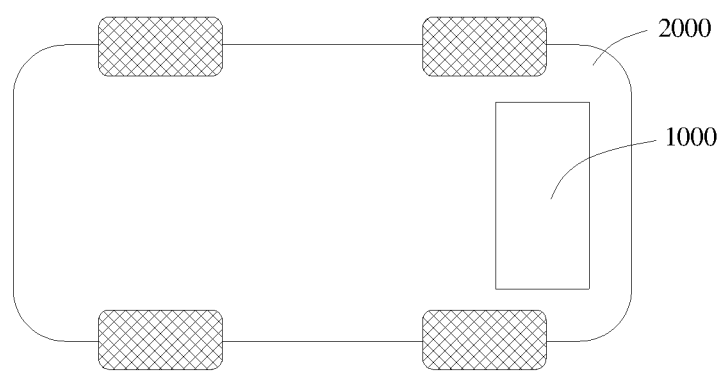
FIG. 12 is a schematic diagram of application of the energy storage device to electric equipment in the present disclosure.

The energy storage device can be applied to a vehicle shown in FIG. 12 and other electric equipment 2000, which will not be detailed here. The electric equipment includes the above energy storage device 1000. The technical solutions of the embodiments of the present disclosure are all applicable to various kinds of electric equipment using energy storage devices, such as an electric bicycle, an electric toy, an electric tool, an electric vehicle, ship and space vehicle, a mobile phone, portable equipment, a laptop, and a notebook.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. An energy storage device, comprising a housing, an electrode assembly, an end cover assembly and a protective film assembly, wherein the protective film assembly comprises an insulation sheet used for wrapping the electrode assembly; the insulation sheet is arranged between the housing and the electrode assembly of the energy storage device; both the insulation sheet and the electrode assembly are accommodated in an inner cavity of the housing; the end cover assembly is connected to one side of the electrode assembly facing away from a bottom surface covering region and covers an opening of the housing; the insulation sheet is integrated; and the insulation sheet is provided with a plurality of fold structures;

the fold structure comprises a plurality of through holes; the plurality of through holes are arranged in sequence along a fold forming direction of the fold structure; the plurality of through holes are arranged in rows along the fold forming direction, and the fold structure comprises two rows of through holes; corners are arranged at intersections of a main surface of the electrode assembly and a first side surface of the electrode assembly, and the main surface of the electrode assembly and a second side surface of the electrode assembly; the through holes are wrapped between the corners and the housing; the through holes satisfy: 0.7 mm≤L3≤1.3 mm and 0.06 mm≤H3≤0.21 mm, wherein L3 is a length of the through hole, and H3 is a width of the through hole; the through holes satisfy: 9≤L3/H3≤11;

the fold structures divide the insulation sheet into:
a bottom surface covering region, clinging to a bottom of the electrode assembly;
main surface covering regions, connected to the bottom surface covering region and clinging to main surfaces of the electrode assembly;
a first side surface covering region, comprising a first covering sub-region and a second covering sub-region, wherein the first covering sub-region and the second covering sub-region are connected to one side of the main surface covering regions; the first covering sub-region and the second covering sub-region overlap after being bent along the fold structures, and cling to a first side surface of the electrode assembly perpendicular to the main surfaces; and
a second side surface covering region, comprising a third covering sub-region and a fourth covering sub-region, wherein the third covering sub-region and the fourth covering sub-region are connected to the other side of the main surface covering regions; the third covering sub-region and the fourth covering sub-region overlap after being bent along the fold structures, and cling to a second side surface of the electrode assembly perpendicular to the main surfaces; the first side surface and the second side surface are oppositely arranged;
wherein a maximum size of the first covering sub-region in a first direction is equal to a maximum size of the second covering sub-region in the first direction, and a maximum size of the first covering sub-region in a second direction is equal to a maximum size of the second covering sub-region in the second direction;
a maximum size of the third covering sub-region in the first direction is equal to a maximum size of the fourth covering sub-region in the first direction, and a maximum size of the third covering sub-region in the second direction is equal to a maximum size of the fourth covering sub-region in the second direction;
wherein the first direction is a thickness direction of the electrode assembly, and the second direction is a height direction of the electrode assembly.

2. The energy storage device according to claim 1, wherein the bottom surface covering region satisfies: 273 mm≤L1≤277 mm, and 55.5 mm≤H1≤59.5 mm;
where L1 is a length of the bottom surface covering region, and H1 is a width of the bottom surface covering region.

3. The energy storage device according to claim 2, wherein the bottom surface covering region satisfies:

1.03≤P1/L1≤1.06, and 1.03≤Q1/H1≤1.06;

where P1 is a length of the electrode assembly, and Q1 is a thickness of the electrode assembly;
a lengthwise direction of the bottom surface covering region and a lengthwise direction of the electrode assembly are both along a third direction, and a width direction of the bottom surface covering region and a thickness direction of the electrode assembly are both along the first direction.

4. The energy storage device according to claim 2, wherein the bottom surface covering region satisfies: 0.20≤H1/L1≤0.21.

5. The energy storage device according to claim 1, wherein one side of the first covering sub-region close to the second covering sub-region is provided with a chamfer structure, and/or one side of the third covering sub-region close to the fourth covering sub-region is provided with a chamfer structure.

6. The energy storage device according to claim 1, wherein a lengthwise direction of the through hole is parallel to the fold forming direction.

7. The energy storage device according to claim 1, wherein the through hole satisfies: 0.7 mm≤L4≤0.9 mm; and L4 is a size of a spacing between adjacent through holes, wherein the through hole satisfies: 1.2≤L3/L4≤1.3.

8. The energy storage device according to claim 1, further comprising a bottom supporting plate, stacked on one surface of the bottom surface covering region close to the bottom of the electrode assembly, wherein one side of the bottom supporting plate facing the bottom surface covering region is provided with a plurality of hot-melting portions; and
the bottom supporting plate is connected to the insulation sheet through the plurality of hot-melting portions in a hot-melting manner.

9. The energy storage device according to claim 8, wherein the hot-melting portion satisfies:

2.7 mm≤M1≤2.9 mm, and 13 mm≤N1≤13.6 mm;

where M1 is a width of the hot-melting portion, and N1 is a length of the hot-melting portion.

10. The energy storage device according to claim 9, wherein the hot-melting portion satisfies 4.5≤N1/M1≤5.

11. The protective film assembly according to claim 10, wherein the hot-melting portion satisfies:

30 mm≤M2≤30.6 mm; and

M2 is a size of a spacing between adjacent hot-melting portions,
wherein a width direction of the hot-melting portion is consistent with a lengthwise direction of the bottom surface covering region, and the plurality of hot-melting portions are disposed in sequence in the lengthwise direction of the bottom surface covering region; and a lengthwise direction of the hot-melting portion is consistent with the width direction of the bottom surface covering region.

12. The energy storage device according to claim 11, wherein the hot-melting portion satisfies: 0.088≤M1/M2≤0.097.

13. The energy storage device according to claim 8, wherein the insulation sheet is provided with a first permeable hole, and the bottom supporting plate is provided with a second permeable hole; the first permeable hole is in communication with the second permeable hole; and an opening area of the first permeable hole is larger than an opening area of the second permeable hole.

14. The energy storage device according to claim 8,
wherein a lengthwise direction of the bottom surface covering region is along a third direction, and
wherein an area of the bottom supporting plate in a plane including the first direction and the third direction is smaller than an area of the bottom surface covering region in the plane including the first direction and the third direction.

15. The energy storage device according to claim 14, wherein the bottom supporting plate satisfies:

268 mm≤$L2$≤272 mm, and 55 mm≤$H2$≤55.6 mm, where L2 is a length of the bottom supporting plate, and H2 is a width of the bottom supporting plate;
the lengthwise direction of the bottom supporting plate is consistent with the lengthwise direction of the bottom surface covering region; and the width direction of the bottom supporting plate is consistent with the width direction of the bottom surface covering region.

16. The energy storage device according to claim 15, wherein the bottom supporting plate satisfies: 0.20≤H2/L2≤0.21, the bottom supporting plate satisfies:

1.01≤$L1/L2$≤1.03 and 1.01≤$H1/H2$≤1.03, where L1 is a length of the bottom surface covering region, and H1 is a width of the bottom surface covering region.

17. The energy storage device according to claim 2, wherein the bottom supporting plate is provided with a plurality of notches; the notches are arranged at an edge of the bottom supporting plate; and the notches are used for being in communication with the inner cavity of the housing, wherein the notch satisfies: 79.6 mm≤M3≤80 mm, and 6.5 mm≤N3≤7.5 mm,
where M3 is a length of the notch, and N3 is a width of the notch.

18. The energy storage device according to claim 7, wherein the plurality of notches are disposed in sequence along the lengthwise direction of the bottom supporting plate; and the lengthwise direction of the notch is consistent with the lengthwise direction of the bottom supporting plate.

19. The energy storage device according to claim 18, wherein the notch satisfies: 0.293≤M3/L2≤0.299, where L2 is a length of the bottom supporting plate, and
wherein the notch satisfies: 49.2 mm≤M4≤50.2 mm; and M4 is a size of a spacing between adjacent notches, wherein the notch satisfies: 1.58≤M3/M4≤1.63.

20. An energy storage device, comprising a housing, an electrode assembly, an end cover assembly and a protective film assembly, wherein the protective film assembly comprises an insulation sheet used for wrapping the electrode assembly; the insulation sheet is arranged between the housing and the electrode assembly of the energy storage device; both the insulation sheet and the electrode assembly are accommodated in an inner cavity of the housing; the end cover assembly is connected to one side of the electrode assembly facing away from a bottom surface covering region and covers an opening of the housing; the insulation sheet is integrated; and the insulation sheet is provided with a plurality of fold structures;
the fold structure comprises a plurality of through holes; the plurality of through holes are arranged in sequence along a fold forming direction of the fold structure; the plurality of through holes are arranged in rows along the fold forming direction, and the fold structure comprises two rows of through holes; corners are arranged at intersections of a main surface of the electrode assembly and a first side surface of the electrode assembly, and the main surface of the electrode assembly and a second side surface of the electrode assembly; the through holes are wrapped between the corners and the housing; the through holes satisfy: 0.7 mm≤L3≤1.3 mm and 0.06 mm≤H3≤0.21 mm, wherein L3 is a length of the through hole, and H3 is a width of the through hole; the through holes satisfy: 9≤L3/H3≤11;
the fold structures divide the insulation sheet into:
two main surface covering regions, clinging to main surfaces of the electrode assembly;
a first side surface covering region, comprising a first covering sub-region, a fifth covering sub-region and a second covering sub-region which are arranged in sequence, wherein one of the two main surface covering regions is connected between the first covering sub-region and the fifth covering sub-region, and the other main surface covering region is connected between the fifth covering sub-region and the second covering sub-region;
a bottom surface covering region, clinging to a bottom of the electrode assembly, wherein the bottom surface covering region is connected to the one of the two main surface covering regions;
wherein the first covering sub-region and the second covering sub-region overlap after being bent along the fold structures and cling to a first side surface of the electrode assembly perpendicular to the main surface;
the fifth covering sub-region clings to a second side surface of the electrode assembly perpendicular to the main surface after being bent along the fold structures; the first side surface and the second side surface are oppositely arranged;
a maximum size of the first covering sub-region in a first direction, a maximum size of the second covering sub-region in the first direction, and a maximum size of the fifth covering sub-region in the first direction are equal; a maximum size of the first covering sub-region in a second direction, a maximum size of the second covering sub-region in the second direction, and a maximum size of the fifth covering sub-region in the second direction are equal; and the first direction is a thickness direction of the electrode assembly, and the second direction is a height direction of the electrode assembly.

* * * * *